(12) United States Patent
Maille et al.

(10) Patent No.: US 7,457,733 B2
(45) Date of Patent: Nov. 25, 2008

(54) MOVING A VIRTUAL ARTICULATED OBJECT IN A VIRTUAL ENVIRONMENT WHILE AVOIDING COLLISIONS BETWEEN THE ARTICULATED OBJECT AND THE ENVIRONMENT

(75) Inventors: Bruno Maille, Paris (FR); Edouard Ramstein, Melun (FR); Patrick Chedmail, La Chapelle sur Erdre (FR)

(73) Assignee: SNECMA, Paris (FR)

( * ) Notice: Subject to any disclaimer, the term of this patent is extended or adjusted under 35 U.S.C. 154(b) by 626 days.

(21) Appl. No.: 10/969,073

(22) Filed: Oct. 21, 2004

(65) Prior Publication Data

US 2005/0096889 A1    May 5, 2005

(30) Foreign Application Priority Data

Oct. 29, 2003    (FR)    ................................ 03 12641

(51) Int. Cl.
*G06F 17/10*    (2006.01)
*G05B 19/04*    (2006.01)

(52) U.S. Cl. ............................ 703/2; 700/255; 700/262

(58) Field of Classification Search ...................... 703/1, 703/2; 345/473; 294/106; 700/245, 255, 700/262

See application file for complete search history.

(56) References Cited

U.S. PATENT DOCUMENTS

| | | | | |
|---|---|---|---|---|
| 5,625,577 A | * | 4/1997 | Kunii et al. | ...................... 703/2 |
| 6,519,860 B1 | * | 2/2003 | Bieg et al. | ...................... 33/503 |
| 6,853,964 B1 | * | 2/2005 | Rockwood et al. | ............. 703/2 |
| 7,024,279 B2 | * | 4/2006 | Rose et al. | .................. 700/245 |
| 7,168,748 B2 | * | 1/2007 | Townsend et al. | ........... 294/106 |
| 2004/0169656 A1 | * | 9/2004 | Piponi et al. | ................. 345/473 |
| 2004/0236541 A1 | * | 11/2004 | Kramer et al. | .................. 703/1 |

OTHER PUBLICATIONS

Duffy et al., N. Real-time collision avoidance system for multiple robots operating in shared work-space, IEE Proceedings, Computers and Digital Techniques, vol. 138, Nov. 1989, pp. 478-084.*

(Continued)

*Primary Examiner*—Russell Frejd
(74) *Attorney, Agent, or Firm*—Oblon, Spivak, McClelland, Maier & Neustadt, P.C.

(57) ABSTRACT

A method of moving a virtual articulated object in a succession of individual movements in a virtual environment, the articulated object being specified in the environment by a global position, a global orientation, and a plurality of joint angles defining the positions of a set of articulated elements making up the articulated object with a plurality of degrees of freedom. The method includes the steps of calculating an interaction distance between the articulated object and its environment; extracting from the interaction distance a first point belonging to one of the elements of the articulated object, and a second point belonging to the environment; and defining a single extraction vector from the first and second points. The method further includes the step of moving the articulated object away from its environment by a movement defined as a function of the single extraction vector and acting on the global position, and/or the global orientation, and/or the degrees of freedom of the articulated object so as to avoid a collision between the articulated object and the environment.

19 Claims, 5 Drawing Sheets

OTHER PUBLICATIONS

Lu et al., L. Folding Cartons with Fixtures: A Motion Planning Approach, Proceedings of the 1999 IEEE International Conference on Robotics & Automation, vol. 2, May 1999, pp. 1570-1576.*

Chang et al., C. Collision Avoidance of Two General Robot Manipulators by Minimum Delay Time, IEEE Transactions on Systems, man, and Cybernetics, vol. 24, No. 3, Mar. 1994, pp. 517-522.*

Yakey et al., J.H. Randomized Path Planning for Linkages With Closed Kinematic Chains, IEEE Transactions on Robotics and Automation, vol. 17, No. 6, Dec. 2001, pp. 951-958.*

Lu et al., L. Folding Cartons with Fixtures: A Motion Planning Approach, IEEE Transactions on Robotics and Automation, vol. 16, No. 4, Aug. 2000, pp. 346-356.*

Chablat et al., D. Architecture Optimization of a 3-DOF Translational Parallel Mechanism for Machining Applications, the Orthoglide, IEEE Transactions on Robotics and Automation, vol. 19, No. 3, Jun. 2003, pp. 403-410.*

Robert J. Anderson, "Using virtual objects to aid underground storage tank teleoperation" Robotics and Automation, 1994, Proceedings., 1994 IEEE International Conference, San Diego, CA, May 8-13, 1994. Los Alamitos, CA, IEEE Comput. Soc, May 8, 1994, pp. 1421-1426, XP010097707.

Bruce Bon, et al., "On-line collision avoidance for the Ranger telerobotic flight experiment" Robotics and Automation, 1996. Proceedings., 1996 IEEE International Conference, Minneapolis, MN; Apr. 22-28, 1996, New York, NY, IEEE, Apr. 22, 1996, pp. 2041-2048, XP010163040.

Bruno Maille, et al., "Multi-agent approach and emergence of a virtual human behaviour in a vr environment" IEEE 2002 International Conference on Systems, Man and Cybernetics. (SMC'02). Yasmine Hammamet, Tunesia, Oct. 6-9, 2002, IEEE International Conference on Systems, Man, and Cybernetics, New York, NY: IEEE, vol. 7 Of 7, Oct. 6, 2002, pp. 119-124, XP010625598.

* cited by examiner

FIG. 8

# MOVING A VIRTUAL ARTICULATED OBJECT IN A VIRTUAL ENVIRONMENT WHILE AVOIDING COLLISIONS BETWEEN THE ARTICULATED OBJECT AND THE ENVIRONMENT

FIELD OF THE INVENTION

The present invention relates to the field of simulating the movement of a virtual articulated object in a virtual environment. The invention relates in particular to avoiding collisions between the articulated object and its environment.

BACKGROUND OF THE INVENTION

In numerous industries, such as the aviation or space industries, it is common practice to use models in virtual reality. For example, a digital mock-up is often used to evaluate interference between various parts.

Similarly, modeling can be used to simulate human or robot actions in a defined environment in order to visualize the movement that a technician or a robot will need to make in order to undertake those actions, for example. This is useful for validating and optimizing accessibility to certain parts of a machine, such as the parts in an airplane engine, which parts require regular inspection and maintenance.

Thus, ease of access to the various elements of a device can be checked virtually as soon as the elements have been modeled, by means of a simulation using a virtual articulated object.

A virtual articulated object is a digital data set defining a dynamic system characterized by a plurality of elements that are articulated with a plurality of degrees of freedom.

Thus, at a given instant, the virtual articulated object may be defined by its position and orientation in a three-dimensional space and by values for the degrees of freedom of its joints. The data and the parameters defining the environment of the virtual articulated object can be stored in a digital data medium.

The use of a virtual articulated object for this type of application already exists.

An example is given in the article by Chedmail, Damay, and Le Roy, entitled "Réalité virtuelle, maquette numérique du produit, outils de distribution et partage de la conception" [Virtual reality, digital mock-up of the product, tools for distributing and sharing designs] (Journées Priméca, La Plagne, Apr. 7-9, 1999).

That article proposes a method of validating accessibility for assembling and disassembling an object in an obstructed environment using a model for the movement of two virtual articulated arms in a virtual environment.

In order to avoid collision between the articulated arms and the environment, the method proposed in the article by Chedmail et al. makes use of calculating a collision line gradient relative to the degrees of freedom of the articulated arms.

Calculating gradients by finite differences requires numerous movements of each articulated arm joint to be performed, and for each movement it is necessary to calculate the length of the collision line. That method is very slow because it is very expensive in calculation time.

OBJECT AND SUMMARY OF THE INVENTION

The present invention seeks to remedy the above-mentioned drawbacks by providing a method and a system making it possible to simulate the displacement or the manipulation of an articulated object while avoiding collisions between the object and its environment and while limiting calculation time.

These objects are achieved by a method of moving a virtual articulated object in a succession of unit movements in a virtual environment, the articulated object being specified in said environment by a global position, a global orientation, and a plurality of joint angles defining the positions of a set of articulated elements making up said articulated object with a plurality of degrees of freedom, the method comprising the following steps:

calculating an interaction distance between the articulated object and its environment;

extracting from said interaction distance a first point belonging to one of the elements of the articulated object, and a second point belonging to the environment;

defining a single extraction vector from said first and second points; and moving the articulated object away from its environment by a movement defined as a function of the single extraction vector and acting on the global position of the articulated object, and/or the global orientation of the articulated object, and/or the degrees of freedom of the articulated object in order to avoid a collision between the articulated object and the environment.

Thus, the method of the invention uses a single interaction distance calculation to move the articulated object away from its environment. This leads to great simplicity and to a significant saving in time.

The method of the invention further comprises a step after each unit movement in said succession of unit movements of determining whether a collision has occurred between the articulated object and its environment.

In a first implementation of the invention, the interaction distance corresponds to a penetration depth, such that the extraction vector is equal to the coordinates of the second point minus the coordinates of the first point, the penetration depth enabling the articulated object to move with limited and controlled amounts of collision with its environment.

In a second implementation of the invention, the interaction distance corresponds to a minimum distance, such that the extraction vector is equal to the coordinates of the first point minus the coordinates of the second point, the minimum distance enabling the articulated object to move without collision with its environment.

The method further comprises a step of canceling the most recent unit movement of said succession of unit movements in the event of a collision arising between the articulated object and its environment.

Advantageously, said steps of extracting the first and second points, of defining the extraction vector, and of moving the articulated object away, are not executed so long as a collision does not occur between the articulated object and the environment.

According to a first feature of the invention, the articulated object can be moved away from its environment by a movement in translation proportional to the components of the extraction vector acting on the global position of the articulated object.

According to a second feature of the invention, the articulated object is moved away from its environment by a movement in rotation acting on the global orientation of the articulated object, the movement in rotation comprising the following steps:

defining a first global vector between the center of gravity of the articulated object and the origin of the extraction vector;

defining a second global vector between the center of gravity of the articulated object and the end of the extraction vector;

calculating a global angle of rotation causing the first global vector to coincide with the second global vector;

calculating one or more individual global angles of rotation by resolving said global angle of rotation about the axis or axes defining the global orientation of the articulated object; and turning the articulated object through one or more angles proportional to said individual global angle(s) of rotation.

According to a third feature of the invention, the articulated object is moved away from its environment by a joint-flexing movement acting on each of the joints belonging to a chain of joints preceding the element of the articulated object to which said first point belongs, the joint-flexing movement acting on each of the joints in said chain of joints comprising the following steps:

defining a first local vector between the articulation center of said given joint and the origin of the extraction vector;

defining a second local vector between the articulation center of said given joint at the end of the extraction vector;

calculating a local angle of rotation for causing the first local vector to coincide with the second local vector;

calculating one or more individual joint angles of rotation by resolving said local angle of rotation onto the axis or axes defining the degree(s) of freedom corresponding to said given joint; and turning the articulated element at said given joint through angle(s) proportional to said individual joint angle(s).

The global angle of rotation may be calculated by means of a global vector product between the first and second global vectors, and the local angle of rotation is calculated by means of a local vector product between the first and second local vectors.

The individual global angle(s) of rotation may be calculated by means of one or more scalar products between the global vector product and the global orientation axis(es), and the individual joint angle(s) is/are calculated by means of one or more scalar products between the local vector products and the axis or axes of the degree(s) of freedom of the given joint.

In a particular implementation of the invention, the articulated object may be moved by means of an attracter agent acting on the global position, and/or the global orientation, and/or the plurality of degrees of freedom of the articulated object.

Advantageously, the method further comprises a step of an operator moving the articulated object in real time by means of an operator agent acting on the position and/or the orientation and/or the plurality of degrees of freedom of the articulated object.

According to a feature of the invention, the articulated object is a virtual dummy moving on a floor of a virtual environment, the dummy being defined by a position on the virtual floor, by an orientation about a vertical axis perpendicular to said floor and passing through the center of gravity of the dummy, and by the plurality of joint angles defining the set of articulated elements.

The invention also provides a computer program designed to implement the above-described method, when executed by a computer.

BRIEF DESCRIPTION OF THE DRAWINGS

Other features and advantages of the method and the system of the invention will appear more clearly on reading the following description given by way of non-limiting indication and with reference to the accompanying drawings, in which.

DETAILED DESCRIPTION OF PREFERRED IMPLEMENTATIONS

Figure 1:
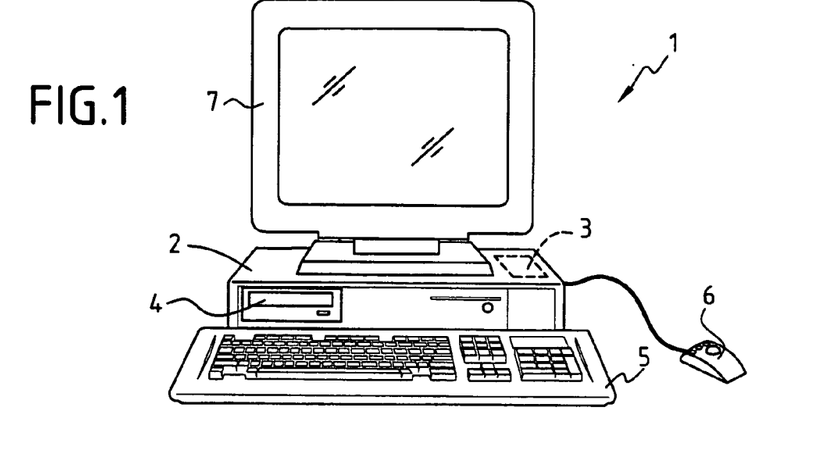
FIG. 1 is a perspective view of hardware means implemented in the system or method of the invention.

FIG. 1 shows a system which can be used for modeling the movement of an articulated object. The system comprises a workstation or computer 1 having good graphics capacity, used for executing a computer program designed to implement the method of the invention.

The computer 1 comprises the hardware means that are usually found in this type of apparatus. More particularly, the computer comprises a central unit 2 which executes the sequences of instructions in the program for implementing the method of the invention, a central memory 3 which stores the data and the programs that are being executed, digital data storage media (hard disk, CD 4, floppy disk, . . . ) for long-term storage of the data and the programs used, input peripherals (keyboard 5, 2D or 3D mouse 6, joystick, . . . ) and output peripherals (screen 7, stereoscopic headsets or glasses, . . . ) in order to be able to view the movement of an articulated object.

Naturally, in order to increase calculation capacity, the modeling of the invention may be implemented on a plurality of workstations operating in parallel.

Figure 2A:
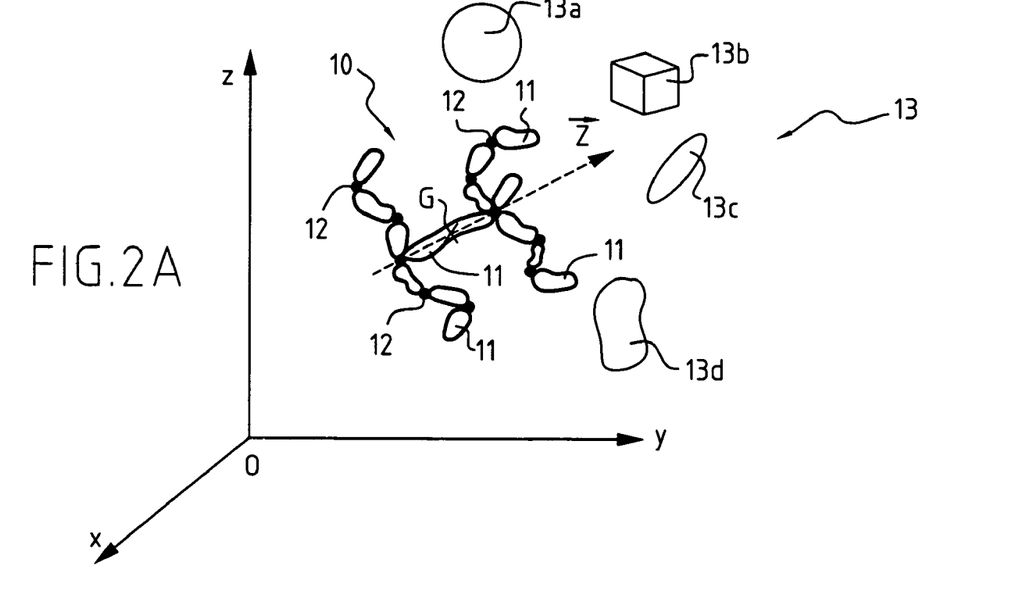
FIG. 2A is highly diagrammatic and shows a virtual articulated object in a three-dimensional space in accordance with the invention.

FIG. 2A is highly diagrammatic and shows a virtual articulated object 10 characterized by a tree structure of joints. Thus, the articulated object 10 is defined as a set of "passive objects", i.e. elements 11 interconnected by joints 12 which can be classified in conventional manner in a plurality of chains of joints.

A local frame of reference having its origin at the center of gravity G of the articulated object 10 can be associated therewith.

In particular, the local frame of reference may have a single axis $\vec{Z}$ passing through the center of gravity G of the articulated object 10.

The articulated object 10 moves in a virtual environment 13 obstructed by a certain number of objects or obstacles 13a, 13b, 13c, and 13d which the articulated object 10 must avoid while it moves. The articulated object 10 and its environment are defined in a three-dimensional space (O; x, y, z).

Using this three-dimensional space, the position and the orientation of the articulated object 10 and also of the various objects 13a, 13b, 13c, and 13d in its environment 13 can be specified in simple manner.

Thus, the articulated object 10 can be specified at all times in the environment 13 by a global position, a global orientation, and a plurality of joint angles defining the position of the set of articulated elements 11 relative to a plurality of degrees of freedom.

The global position of the articulated object 10 can be defined by Cartesian coordinates along the axes x, y, and z for its center of gravity G.

Its global orientation can be specified in known manner by three angles defining the orientation of the axis $\vec{Z}$ associated with the articulated object relative to the axes x, y, and z.

Naturally, it is also necessary to take account of the parameters or constraints that are imposed by the limits on the joints and by the physical connections between the various members or elements 11 of the articulated object 10.

These data and variables defining the articulated object 10 and the parameters defining its environment 13 are stored in the digital data medium 3 of the computer system 1.

Figure 2B:
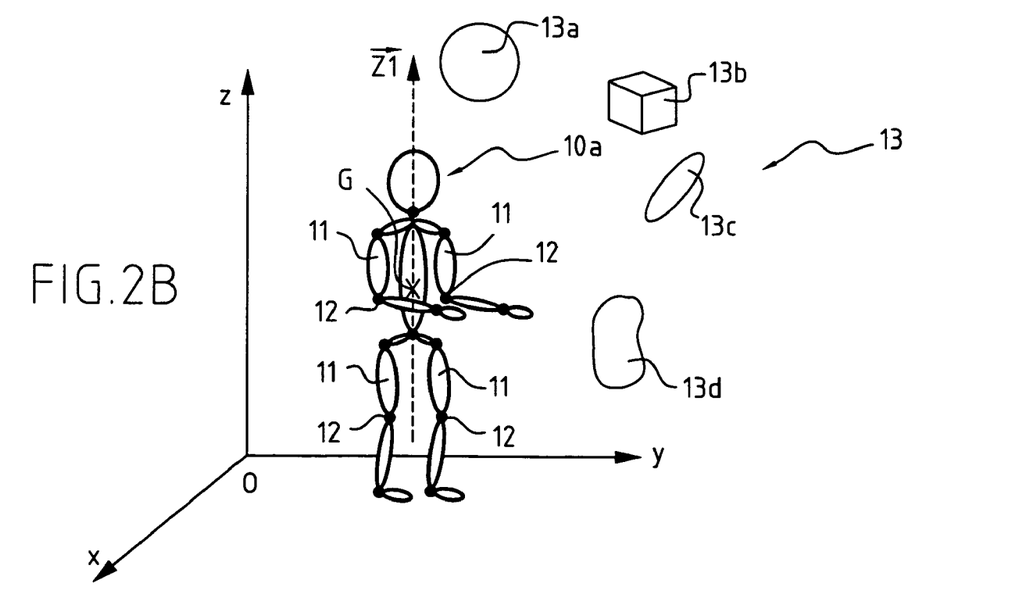
FIG. 2B is highly diagrammatic and shows a virtual dummy in a three-dimensional space in accordance with the invention.

FIG. 2B shows that the articulated object may be constituted in particular by a virtual dummy 10a moving on the floor of the virtual environment 13.

Under such circumstances, the dummy 10a can be defined by its position on the virtual ground, its orientation about a vertical axis $\vec{Z1}$ perpendicular to said ground and passing through the center of gravity G of the dummy 10a, and by a plurality of joint angles defining the set of articulated elements.

In conventional manner, the articulated object 10 such as the dummy 10a can be moved in the virtual environment 13 in a succession of unit movements, e.g. in order to reach a target 13c.

Thus, in order to generate a trajectory enabling the articulated object 10 to reach its target 13c, it is possible to act on the global position of the articulated object 10 using a predefined step size for moving its position, and/or on the global orientation of the articulated object using a predefined step size for changing orientation, and/or the plurality of degrees of freedom of the articulated object using a predefined step size for joint movement Δa.

This leads to the articulated object 10 being attracted towards its target 13c without taking into consideration the dimensions of the target 10c or of any of the other objects 13a, 13b in the environment.

In order to enable the articulated object 10 to avoid collisions with its environment 13, it is necessary to define a collision criterion. Such a criterion can be defined in a manner known to the person skilled in the art by calculating an interaction distance between the articulated object 10 and its environment 13, which calculation also provides points that materialize said interaction distance.

It should be observed that the interaction distance can correspond to a minimum distance or to a penetration depth between the articulated object 10 and its environment.

Figure 3A:
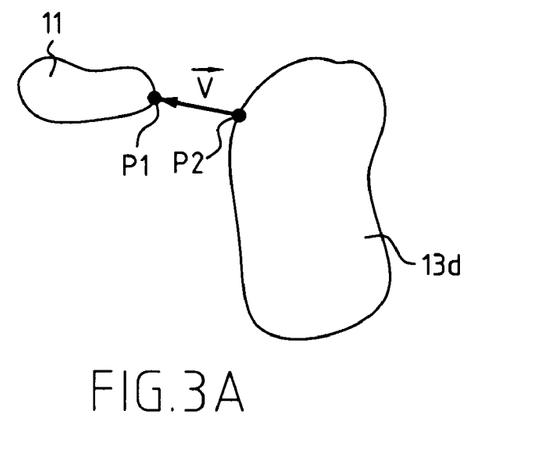
FIG. 3A is highly diagrammatic and shows an extraction vector defined in a minimum distance mode of the invention.
Figure 3B:
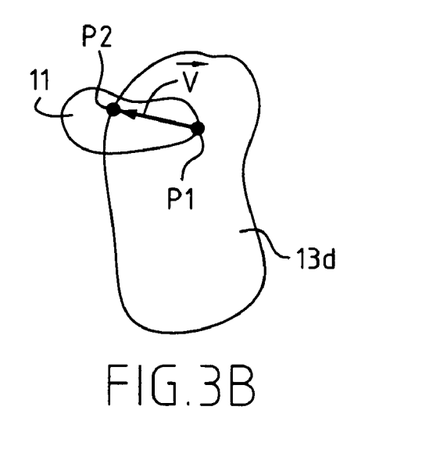
FIG. 3B is highly diagrammatic and shows an extraction vector defined in a penetration depth mode of the invention.

FIGS. 3A and 3B illustrate recognition of the interaction distance between an element of the articulated object 10 and an object 13d belonging to the environment.

The example of FIG. 3A shows more particularly the minimum distance criterion between the articulated object 10 and its environment, and it also shows the points P1 and P2 materializing said minimum distance.

In addition, the example of FIG. 3B illustrates more particularly the penetration depth criterion between the articulated object 10 and its environment, and it defines the points P1 and P2 defining said penetration depth.

Thus, calculating the interaction distance makes it possible to extract a point P1 referred to as the "first" point in the description below belonging to one of the elements 11 of the articulated object 10, and another point P2, referred to as the "second" point in the description below, and belonging to the environment 13.

From these first and second points P1 and P2 it is then possible to define a single extraction vector $\vec{V}$.

In the mode based on calculating a minimum distance (FIG. 3A), the extraction vector $\vec{V}$ is equal to the coordinates of the first point P1 minus the coordinates of the second point P2. In other words, the second point P2 is the origin of the extraction vector $\vec{V}$ and the first point P1 is the end of the extraction vector $\vec{V}$.

In contrast, in the mode based on calculating a penetration depth (FIG. 3B), the extraction vector $\vec{V}$ is equal to the coordinates of the second point P2 minus the coordinates of the first point P1. In other words, the first point P1 is the origin of the extraction vector $\vec{V}$ and the second point P2 is the end of the extraction vector $\vec{V}$.

Finally, in order to avoid a collision between the articulated object 10 and the environment 13, said articulated object 10 can be moved away from its environment by a movement that is defined as a function of the single extraction vector $\vec{V}$ by acting on the global position, and/or the global orientation, and/or the degrees of freedom of the articulated object 10.

Figure 4:
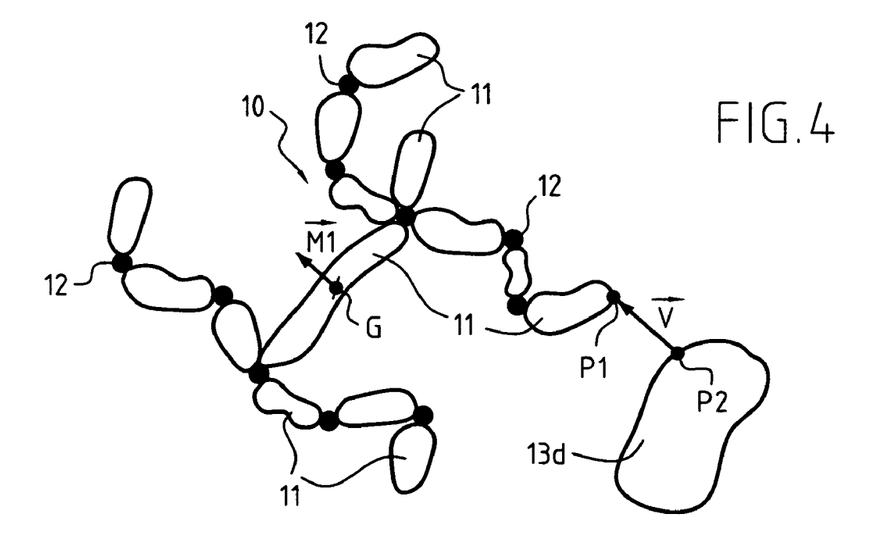
FIG. 4 is highly diagrammatic and shows a separation movement acting on the global position of the articulated object in accordance with the invention.
Figure 5:
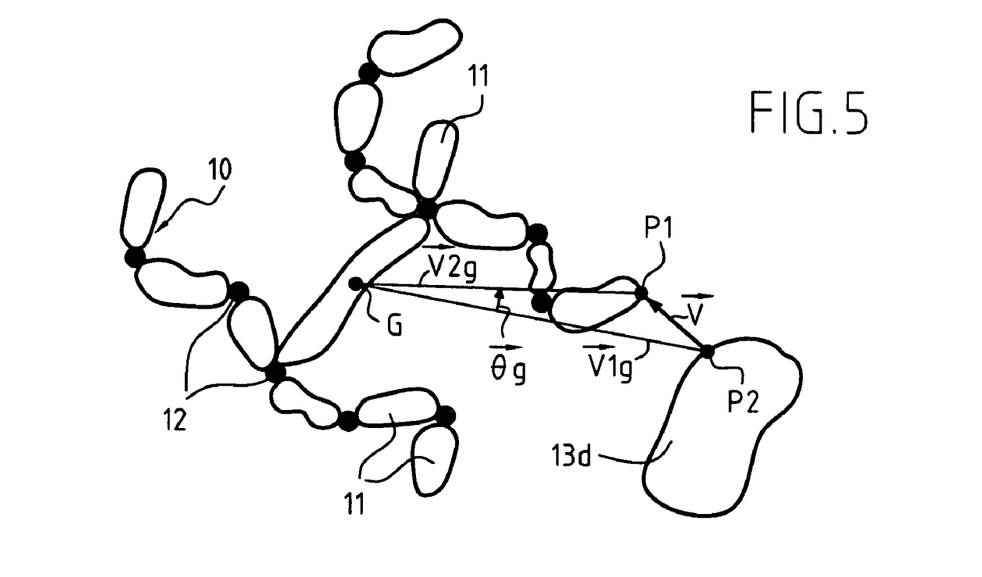
FIG. 5 is highly diagrammatic and shows a separation movement acting on the global orientation of the articulated object of the invention.
Figure 6:
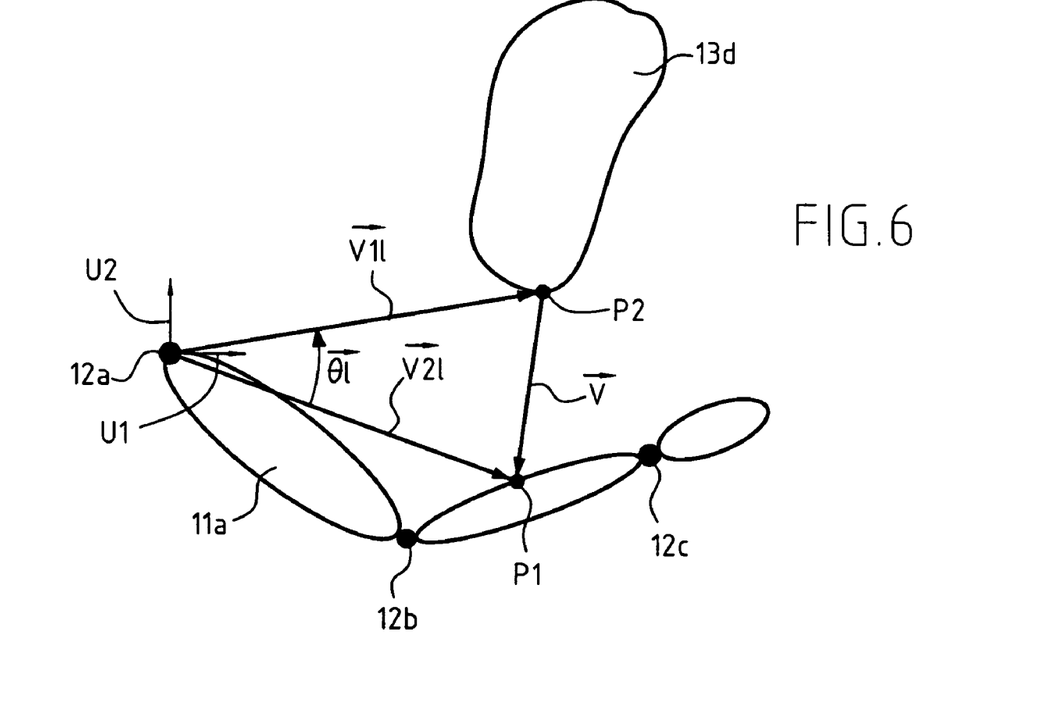
FIG. 6 is highly diagrammatic and shows a separation movement acting on a given joint of the articulated object of the invention.

FIGS. 4 to 6 show separation movements of the articulated object implemented using the minimum distance mode, but naturally the principle is the same when using the penetration depth mode.

FIG. 4 shows a separation movement acting on the global position of the articulated object.

Thus, the articulated object 10 is moved away from its environment 13 by a movement in translation $\vec{M1}$ proportional to the components of the extraction vector $\vec{V}$ acting on the global position of the articulated object, i.e. $\vec{M1} = \lambda \vec{V}$, where λ is a positive coefficient.

In particular, in the example of a dummy 10a where the global position is defined in a plane (x, y), it is solely the projection of the extraction vector $\vec{V}$ onto said plane that is taken into consideration.

The movement in translation thus contributes to avoiding collision by making the articulated object 10 perform a global movement.

It should be observed that the single extraction vector $\vec{V}$ calculated from a minimum distance or a penetration depth can be normalized by the value of the unit step size in position movement Δp, i.e. the movement in translation $\vec{M1}$ is given by the following equation:

$$\vec{M1} = \vec{V}/\Delta p$$

FIG. 5 shows a separation movement acting on the global orientation of the articulated object.

The articulated object 10 is moved away from its environment 13 by determining the rotation that is to be performed about a point, e.g. the center of gravity G, causing the articulated object 10 to move the point of application of the extraction vector $\vec{V}$ on the articulated object 10 along said vector $\vec{V}$. This rotation is normalized by the step size in orientation movement Δo.

This movement in rotation acting on the global orientation of the articulated object 10 can be determined by the following steps.

A first vector $\vec{V1g}$ referred to as the "first global vector" in the description below, is defined between the center of gravity G of the articulated object 10 and the origin of the extraction vector $\vec{V}$. In this example, the origin of the extraction vector $\vec{V}$ is the second point P2, but it would be the first point P1 when using penetration depth mode.

Similarly, a second global vector $\vec{V2g}$ is defined between the center of gravity G of the articulated object 10 and the end P1 of the extraction vector $\vec{V}$.

Thereafter, an angle of rotation $\vec{\theta g}$, referred to as the "global angle of rotation" in the description below, is calculated to cause the first global vector $\vec{V1g}$ to coincide with the second global vector $\vec{V2g}$. The global angle of rotation $\vec{\theta g}$ can be calculated by means of a vector product referred to below as the "global vector product" between the first and second global vectors $\vec{V1g}$ and $\vec{V2g}$. Thus, the global angle of rotation $\vec{\theta g}$ is given by the following equation:

$$\vec{\theta g} = \frac{\vec{V1g} \times \vec{V2g}}{\vec{V1g} \cdot \vec{V2g}}$$

This global angle of rotation $\vec{\theta g}$ is resolved into one or more individual global angles of rotation θgi about the axis or axes defining the global orientation of the articulated object. The individual angle(s) θgi of global rotation can be calculated by means of scalar products between the global vector product and the global orientation axis or axes.

Finally, the articulated object 10 is turned through one or more angles α proportional to said individual angle(s) θgi of global rotation. The individual angles $\vec{\theta gi}$ of global rotation are normalized by the values corresponding to step size in orientation movement Δo, i.e. α=θgi/Δo.

In particular, when the global orientation of the articulated object is defined by a single axis $\vec{Z}$ as in the example of FIG. 2, then there results a single normalized individual angle α of global rotation defining the movement in rotation of the articulated object about said axis $\vec{Z}$, and given by the following equation:

$$\alpha = \sin^{-1}\frac{\vec{Z} \cdot \vec{\theta g}}{\Delta o}$$

FIG. 6 shows a joint-flexing movement acting on the degrees of freedom of the articulated object.

It should be observed that the articulated object 10 is moved away from its environment 13 by a joint-flexing movement acting on each of the joints 12 belonging to a chain of joints preceding the element 11 of the articulated object to which the above-defined first point P1 belongs (see FIGS. 2A and 2B).

By way of example, if the articulated object is a virtual dummy 10a, and if the interaction distance between the dummy 10a and the environment 13 is materialized by a first point P1 on the forearm, then the chain of joints corresponds to the elbow, the shoulder, and the clavicle. In other words, the joint-flexing movement is calculated to act on all of the joints 12 in the arm preceding the forearm. Otherwise, if the first point P1 belongs to the upper arm, then the chain of joints comprises solely the shoulder joint and the clavicle. If the first point P1 belongs to the hand, then all of the joints 12 of the arm would be taken into consideration, i.e. the chain of joints comprises the wrist, the elbow, the shoulder, and the clavicle.

Thus, for a given articulated object 10, the chain of joints depends on which element 11 of the articulated object 10 includes the first point P1.

In particular, the example of FIG. 6 shows the movement of joint rotation acting on a given joint 12a forming part of a chain of joints 12a, 12b, and 12c.

The movement of joint rotation acting on a given joint 12a can be determined by the following steps.

A first vector $\vec{V1l}$, referred to as the "first local vector" in the description below is defined between the articulation center of said given joint 12a and the origin P2 of the extraction vector $\vec{V}$.

Similarly, a second local vector $\vec{V2l}$ is defined between the articulation center of said given joint 12a and the end P1 of the extraction vector $\vec{V}$.

Thereafter, an angle of rotation $\vec{\theta l}$, referred to as the "local angle of rotation" in the description below, is calculated so as to cause the first vector $\vec{V1l}$ to coincide with the second local vector $\vec{V2l}$. The local angle of rotation $\vec{\theta l}$ can be calculated by means of a vector product referred to below as the "local vector product" between the first and second local vectors $\vec{V1l}$ and $\vec{V2l}$, using the following formula:

$$\vec{\theta l} = \frac{\vec{V1l} \times \vec{V2l}}{\vec{V1l} \cdot \vec{V2l}}$$

This local angle of rotation $\vec{\theta l}$ is resolved into one or more individual angles θli of joint rotation about the axis or axes $\vec{U1}$ defining the degree(s) of freedom corresponding to said given joint 12a of the articulated object 10. In this example, the given joint 12a has two axes $\vec{U1}$ and $\vec{U2}$. The individual angle(s) θli of joint rotation can be calculated by means of one or more scalar products between the local vector product and the axis or axes $\vec{Ui}$ of the degrees of freedom of the given joint 12a.

Finally, the articulated element at said given joint is turned through one or more angles αi proportional to said individual angle(s) θli of the joint.

The individual joint angles θli are normalized by values corresponding to the step size in joint movement Δo.

The articulated element at said given joint is turned through one or more angles αi given by the following formula:

$$\alpha i = \sin^{-1} \frac{\vec{Ui} \cdot \vec{\theta l}}{\Delta a}$$

Naturally, the same above steps need to be performed on all of the joints 12a, 12b, and 12c making up the chain of joints under consideration.

Thus, using a single extraction vector $\vec{V}$ calculated from a minimum distance or a penetration depth makes it possible significantly to improve the collision-avoiding procedure between the articulated object 10 and the environment 13.

The present invention makes it possible to reduce considerably the number of minimum distances or penetration depths that are calculated, which calculations require a great deal of calculation time, compared with the number of gradient calculations required in the prior art, and makes this possible without affecting the precision with which collision is avoided between the articulated object and the environment.

Figure 7A:
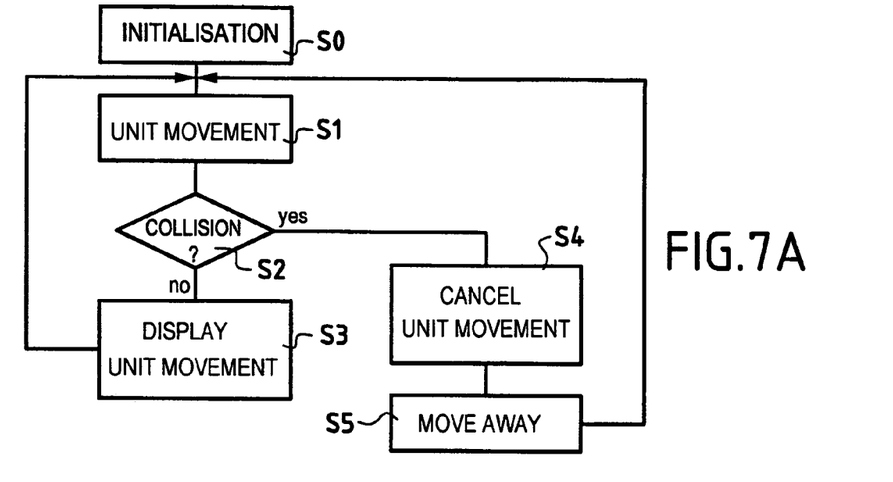
FIG. 7A is a flow chart showing the main steps in moving the articulated object in accordance with the invention.

FIG. 7A is a flow chart showing the main steps modeling the movement of the articulated object while avoiding collisions between the object and its environment.

Step S0 is an initialization step of the flow chart in which various parameters are defined. For example a counter for clocking calculation pulses or steps of the model is initialized.

Similarly, the unit movements or steps in position movement Δp, in orientation movement Δo, and in joint movement Δa can also be defined in step S0. For example, it is possible to use different step sizes depending on the nature of the joint 12. It is also possible to select an optimum constant step size for all of the joints 12 and all along the trajectory of the articulated object 10.

In step S1, an individual movement of the articulated object 10 is calculated.

Step S2 is a test to determine whether or not there is collision between the articulated object 10 and the environment 13. The collision criterion depends on the value of the interaction distance.

In other words, for the mode based on minimum distance, it can be assumed that a collision has arisen if the minimum distance is less than or equal to a threshold minimum distance which can be equal to zero, in order to enable the articulated object 10 to move without colliding with its environment 13.

In contrast, for the mode based on penetration depth, it can be considered that a collision has occurred if said depth is greater than or equal to a threshold penetration depth. Thus, depending on how the value is chosen for said threshold, it is possible firstly to allow the articulated object 10 to move without colliding with its environment 13, or secondly to allow the articulated object 10 to move with a limited and controlled amount of collision with its environment 13. This circumstance makes it possible to model a degree of plasticity when the articulated object 10 is in contact with an object of the environment 13.

If there is no collision according to the criterion used in the preceding step S2, then in step S3, the displacement of the articulated object 10 as calculated in step S1 is displayed on the screen 7 of the computer 1, for example, prior to returning to said step S1 in order to calculate the next unit movement.

Thus, in step S3, the steps of extracting the first and second points, of defining the extraction vector, and of moving the articulated object 10 away from the environment 13 are not executed.

In contrast, if there is a collision, then the unit displacement calculated in step S1 is canceled in step S4.

Thereafter, in step S5, the movement defined as a function of the single extraction vector and acting on the global position, and/or the global orientation, and/or the degrees of freedom of the articulated object is calculated in order to move the articulated object 10 away from its environment 13 prior to looping back to step S1.

Figure 7B:
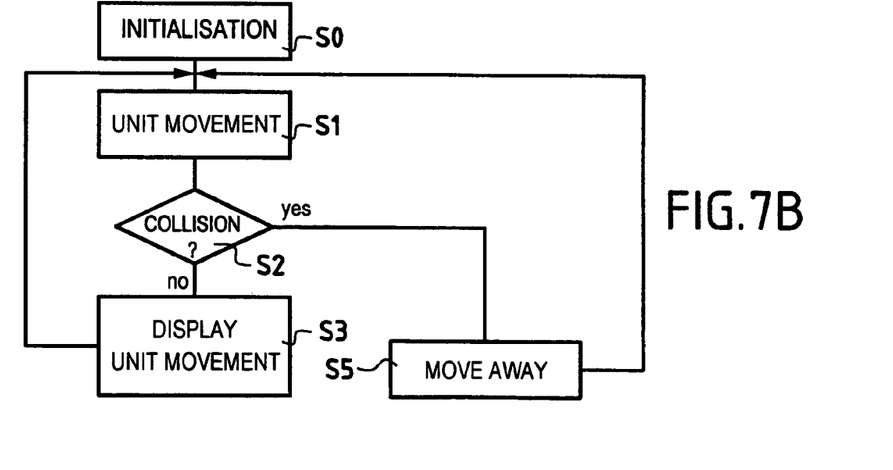
FIG. 7B shows a variant of FIG. 7A.

FIG. 7B shows a variant of FIG. 7A which is valid solely for the mode of calculation that uses penetration depth.

The flow chart of this figure is the same as that of FIG. 7A, except that step S4 no longer exists.

Thus, if there is a collision in step S2, the method moves on immediately to step S5 of moving the articulated object 10 away from its environment 13 without canceling the latest unit movement, thereby allowing for a small amount of penetration between the articulated object 10 and its environment 13.

The virtual articulated object 10 can be moved in a virtual environment 13 by means of a "multi-agent" system, or by any other known system.

Figure 8:
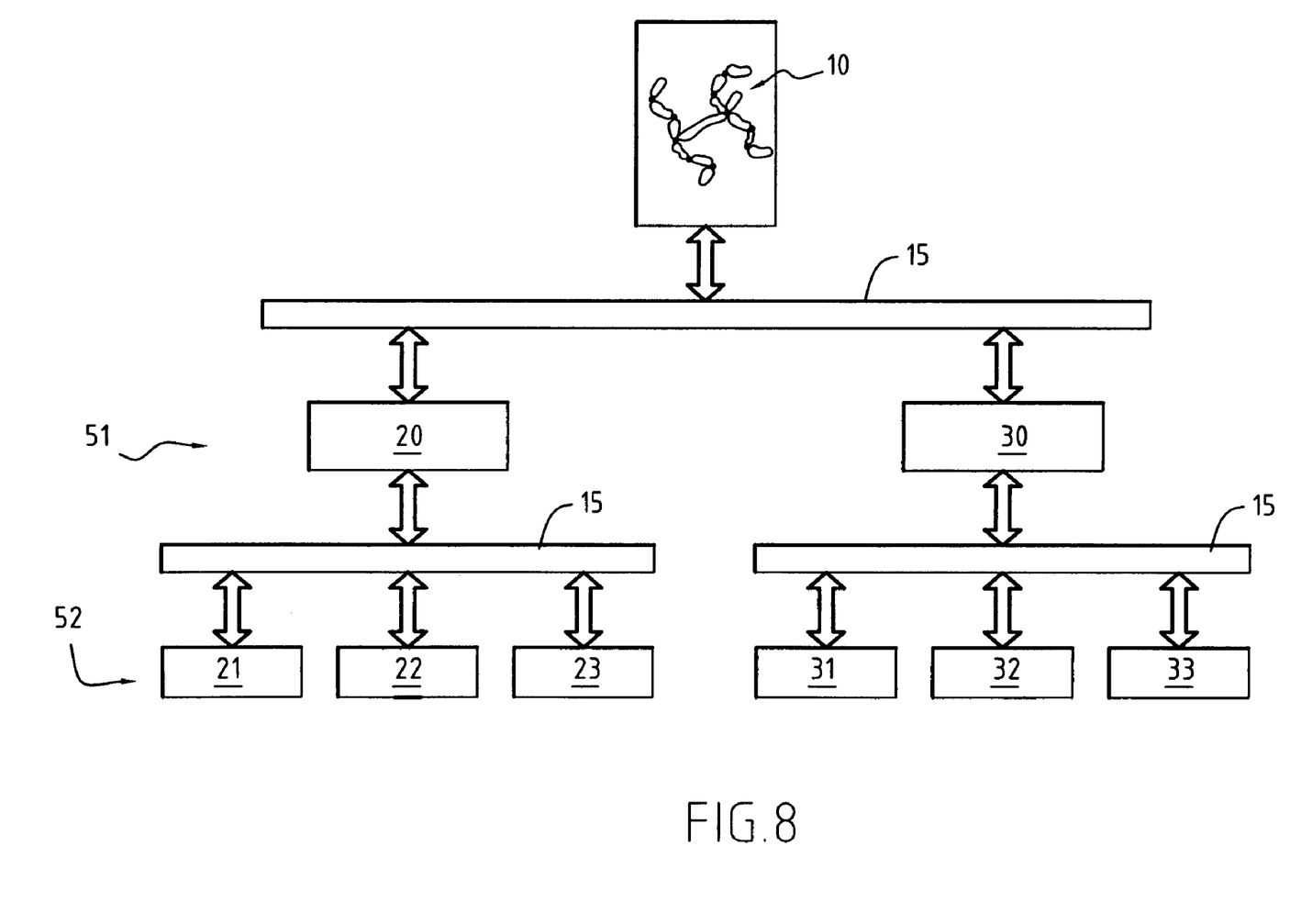
FIG. 8 is highly diagrammatic and shows an architecture for a multi-agent system used for moving the articulated object in accordance with the invention.

FIG. 8 is highly diagrammatic and shows an architecture for a multi-agent system 50 which can be used for modeling the displacement of an articulated object 10. The multi-agent system 50 is made up of a set of active elements or agents 20, 21, 22, 23, 30, 31, 32, and 33 which act on the passive objects (elements 11 and joints 12) making up the articulated object 10, as a function of its environment.

The data or variables defining the articulated object 10 and its environment constitute shared data 15 through which the various agents interact.

The architecture of the multi-agent system can be organized in a plurality of stages or levels, in pyramid manner, so that the base level agents contribute to the actions of agents which are on a higher level.

In this example, the multi-agent system 50 presents a first level 51 and a second level 52. The first level 51 illustrates the action or the global contribution on the articulated object 10 and comprises the contribution of a first global agent 20 and the contribution of a second global agent 30 acting on the articulated object 10 via the shared data 15.

The first global agent 20 acts on the global position and orientation of the articulated object 10, and the second global agent 30 acts on the internal degrees of freedom of the joints 12 of the articulated object 10.

The second level 52 illustrates various contributions coming from various types of agent which generate the contributions of the first and second global agents 20 and 30 by interacting via the shared data 15.

Thus, movement of the articulated object 10 can be implemented by means of an attracter agent acting on the global position, and/or the global orientation, and/or the plurality of degrees of freedom of the articulated object.

In addition, the articulated object can be moved away from its environment by means of an avoider agent acting on the global position, and/or the global orientation, and/or the plurality of degrees of freedom of the articulated object.

Thus, the second level 52 of the multi-agent system 50 can comprise a repulsive avoider agent 21 acting on the global position and/or orientation of the articulated object 10, a global attracter agent 22 acting on the global position and/or orientation of the articulated object 10, a dynamic avoider agent 31 acting on the internal degrees of freedom of the joint 12 of the articulated object 10, and a dynamic attracter agent 32 acting on the internal degrees of freedom of the joint 12 of the articulated object 10.

In addition, the articulated object 10 may be moved in real time by an operator by means of an operator agent acting on the position and/or the orientation and/or the plurality of degrees of freedom of the articulated object.

Thus, the second level 52 of the multi-agent system 50 can also include a global operator agent 23 acting on the global position and/or orientation of the articulated object 10, and an internal operator agent 33 acting on the internal degrees of freedom of the joints 12 of the articulated object 10.

What is claimed is:

1. A method of moving an articulated object, which is virtual, in a succession of unit movements in an environment, the articulated object being specified in said environment by a global position, a global orientation, and a plurality of joint angles defining the positions of a set of articulated elements making up said articulated object with a plurality of degrees of freedom, the method comprising the following steps:
   calculating an interaction distance between the articulated object and its environment;
   extracting from said interaction distance a first point belonging to one of the elements of the articulated object, and a second point belonging to the environment;
   defining a single extraction vector from said first and second points; and
   moving the articulated object away from its environment by a movement defined as a function of the single extraction vector, the separation movement being implemented by a movement in translation acting on the global position of the articulated object, and/or a movement in rotation acting on the global orientation of the articulated object, and/or a joint-flexing movement acting on a joint belonging to a chain of joints preceding the element of the articulated object to which said first point belongs,
   wherein the movement in rotation acting on the global orientation of the articulated object comprises the following steps:
      defining a first global vector between the center of gravity of the articulated object and the origin of the extraction vector;
      defining a second global vector between the center of the articulated object and the end of the extraction vector;
      calculating a global angle of rotation causing the first global vector to coincide with the second global vector;
      calculating one or more individual global angles of rotation by resolving said global angle of rotation about the axis or axes defining the global orientation of the articulated object; and
      turning the articulated object through one or more angles proportional to said one or more individual global angles of rotation.

2. A method according to claim 1, further comprising a step after each unit movement in said succession of unit movements of determining whether a collision has occurred between the articulated object and its environment.

3. A method of moving an articulated object, which is virtual, in a succession of unit movement in an environment, the articulated object being specified in said environment by a global position, a global orientation, and a plurality of joint angles defining the positions of a set of articulated elements making up said articulated object with a plurality of degrees of freedom, the method comprising the following steps:
   calculating an interaction distance between the articulated object and its environment;
   extraction from said interaction distance a first point belonging to one of the elements of the articulated object, and a second point belonging to the environment;
   defining a single extraction vector from said first and second points; and
   moving the articulated object away from its environment by a movement defined as a function of the single extraction vector, the separation movement being implemented by a movement in translation acting on the global position of the articulated object, and/or a movement in rotation acting on the global orientation of the articulated object, and/or a joint-flexing movement action on a joint belonging to chain of joints preceding the element of the articulated object to which said first point belongs,
   wherein the interaction distance corresponds to a penetration depth, such that the extraction vector is equal to the coordinates of the second point minus the coordinates of the first point, the penetration depth enabling the articulated object to move with limited and controlled amounts of collision with its environment.

4. A method according to claim 1, wherein the interaction distance corresponds to a minimum distance, such that the extraction vector is equal to the coordinates of the first point minus the coordinates of the second point, the minimum distance enabling the articulated object to move without collision with its environment.

5. A method according to claim 1, further comprising a step of canceling the most recent unit movement of said succession of unit movements in the event of a collision arising between the articulated object and its environment.

6. A method according to claim 1, wherein said steps of extracting the first and second points, of defining the extraction vector, and of moving the articulated object away, are not executed whenever a collision does not occur between the articulated object and the environment.

7. A method according to claim 1, wherein the movement in translation is proportional to the components of the extraction vector acting on the global position of the articulated object.

8. A method according to claim 1, wherein the joint-flexing movement acting on a joint of the joints belonging to the chain of joints preceding the element of the articulated object to which said first point belongs, comprising the following steps:
   defining a first local vector between the articulation center of said joint and the origin of the extraction vector;
   defining a second local vector between the articulation center of said joint at the end of the extraction vector;
   calculating a local angle of rotation for causing the first local vector to coincide with the second local vector;
   calculating one or more individual joint angles of rotation by resolving said local angle of rotation onto the axis or axes defining the degrees of freedom corresponding to said joint; and
   turning the articulated element at said joint through angles proportional to said one or more individual joint angles.

9. A method according to claim 1, wherein the global angle of rotation is calculated by means of a global vector product between the first and second global vectors, and the local angle of rotation is calculated by means of a local vector product between the first and second local vectors.

10. A method according to claim 9, wherein the one or more individual global angles of rotation are calculated by means of one or more scalar products between the global vector product and axis or axes defining the global orientation, and the one or more individual joint angles of rotation are calculated by means of one or more scalar products between the local vector products and the axis or axes of the degrees of freedom of the joint.

11. A method according to claim 1, wherein the articulated object is moved by means of an attracter agent acting on the global position, and/or the global orientation, and/or the plurality of degrees of freedom of the articulated object.

12. A method according to claim 1, wherein the articulated object is moved away from its environment by means of an avoider agent acting on the global position, and/or the global orientation, and/or the plurality of degrees of freedom of the articulated object.

13. A method according to claim 1, wherein the method further comprises a step of an operator moving the articulated object in real time by means of an operator agent acting on the position and/or the orientation and/or the plurality of degrees of freedom of the articulated object.

14. A method according to claim 1, wherein the articulated object is a virtual dummy moving on a floor of a virtual environment, the dummy being defined by a position on the virtual floor, by an orientation about a vertical axis perpendicular to said floor and passing through the center of gravity of the dummy, and by the plurality of joint angles defining the set of articulated elements.

15. A method of moving an articulated object, which is virtual, in a succession of unit movement in an environment, the articulated object being specified in said environment by a global position, a global orientation, and a plurality of joint angles defining the positions of a set of articulated elements making up said articulated object with a plurality of degrees of freedom, the method comprising the following steps:

calculating an interaction distance between the articulated object and its environment;

extracting form said interaction distance a first point belonging to one of the elements of the articulated object, and second point belonging to the environment;

defining a single extraction vector from said first and second points; and moving the articulated object away from its environment by a movement defined as a function of the single extraction vector, the separation movement being implemented by a movement in translation acting on the global position of the articulated object, and/or a movement in rotation acting on the global orientation of the articulated object, and/or a joint-flexing movement action on a joint belonging to a chain of joints preceding the element of the articulated object to which said first point belongs.

16. A method according to claim 15, further comprising a step after each unit movement in said succession of unit movements of determining whether a collision has occurred between the articulated object and its environment.

17. A method according to claim 15, wherein the interaction distance corresponds to minimum distance, such that the extraction vector is equal to the coordinates of the first point minus the coordinates of the second point, the minimum distance enabling the articulated object to move without collision with its environment.

18. A method according to claim 15, further comprising a step of canceling the most recent unit movement of said succession of unit movements in the event of a collision arising between the articulated object and its environment.

19. A method according to claim 15, wherein said steps of extracting the first and second points, of defining the extraction vector, and of moving the articulated object away, are not executed whenever a collision does not occur between the articulated object and the environment.

* * * * *